Sept. 11, 1928.

W. G. NORDLING

ELECTRIC HOT PLATE

Filed Dec. 26, 1925

INVENTOR
William G. Nordling

Sept. 11, 1928.  1,684,374
W. G. NORDLING
ELECTRIC HOT PLATE
Filed Dec. 26, 1925 2 Sheets-Sheet 2
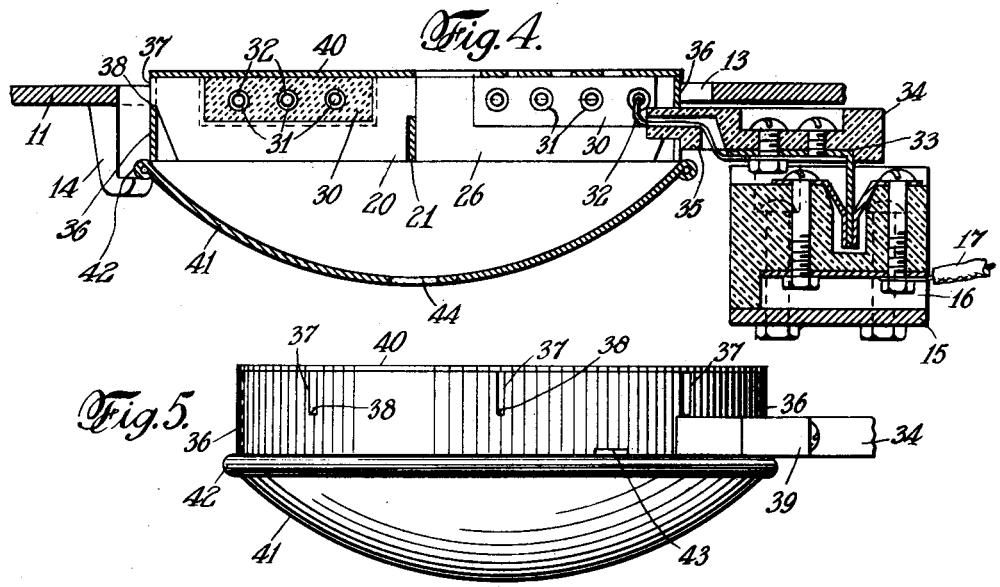
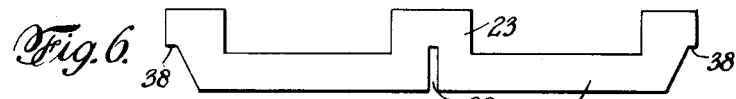
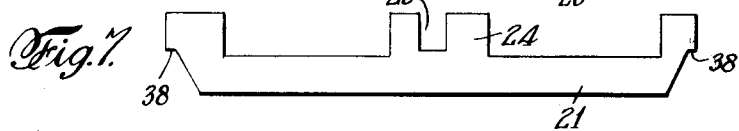
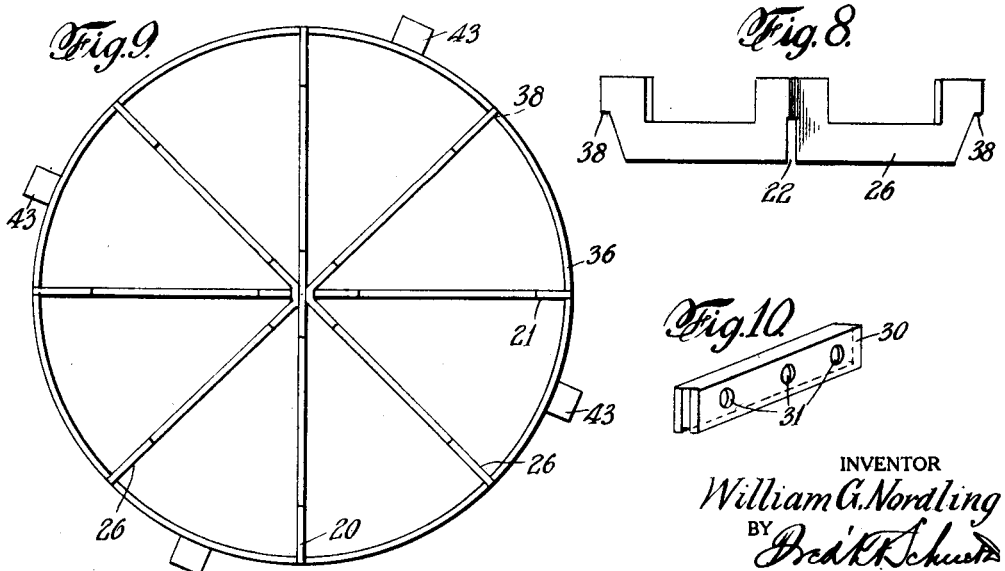
INVENTOR
William G. Nordling
BY
ATTORNEY Patented Sept. 11, 1928.

1,684,374

UNITED STATES PATENT OFFICE.

WILLIAM G. NORDLING, OF NEWARK, NEW JERSEY.

ELECTRIC HOT PLATE.

Application filed December 26, 1925. Serial No. 77,681.

The invention relates to an electric heater device for cooking purposes, and is of the hot plate type designed to support and heat a suitable utensil such as a cooking pot or pan containing the substance to be heated.

It has for its object to so concentrate the heat developed thereby that the same is applied to the cooking utensil in a more or less torch like column, similarly to a gas flame, whereby an extremely rapid heating of the substance is attained. A further object of the invention resides in a heater device which shall be simple and durable and of inexpensive construction and in which the heating element portion may readily and conveniently be replaced when worn out. A still further object of the invention consists in a construction in which the upper portion of the resistor element employed is not exposed, thus obviating deterioration of the same and loss in efficiency of operation due to foreign matter collecting thereon.

To this end, the invention consists in the novel features of construction hereinafter set forth and shown in the accompanying drawings, in which—

Fig. 4 is a detail vertical section thru the novel heating unit and portion of support therefor.

Fig. 5 is an end view of a complete unit.

Fig. 6 is an elevation of one of the members forming the spider support for the resistor element of the unit.

Fig. 7 is a similar view of a further arm member thereof.

Fig. 8 is a front elevation of an angle form of spider arm of the type indicated in Fig. 6.

Fig. 9 is a plan view of the spider assembly and supporting ring therefor.

Fig. 10 is a detail elevation of the insulating support for the resistor element.

Figure 1:
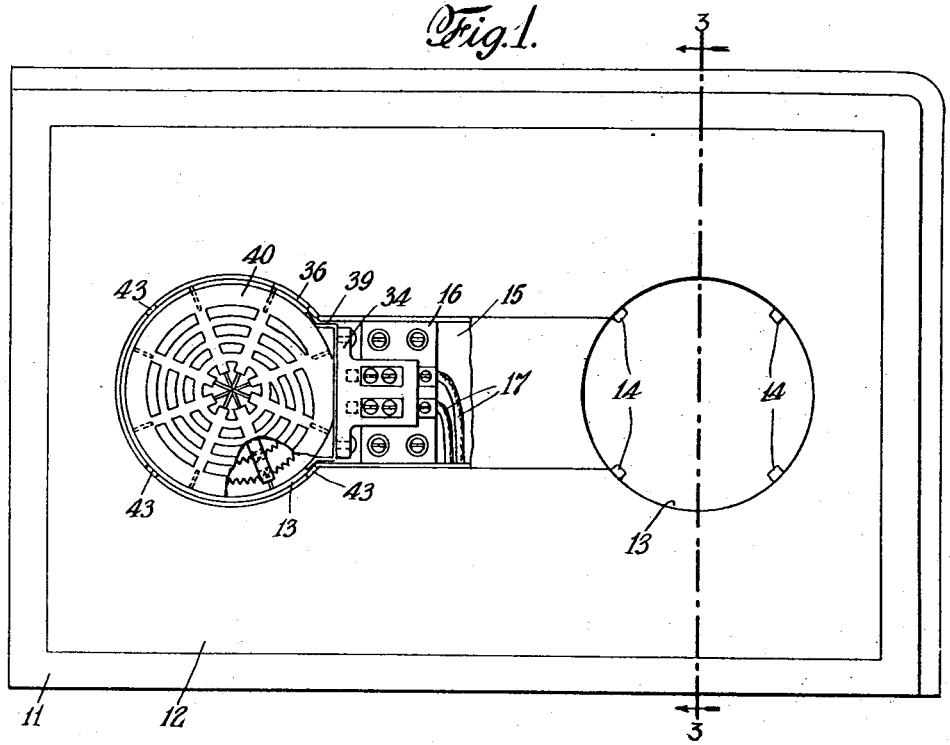
Fig. 1 is a plan of an electric stove illustrating one of the openings in the top equipped with the novel heater unit, a portion of the same being broken away as well as a portion of the top plate of the stove.
Figure 2:
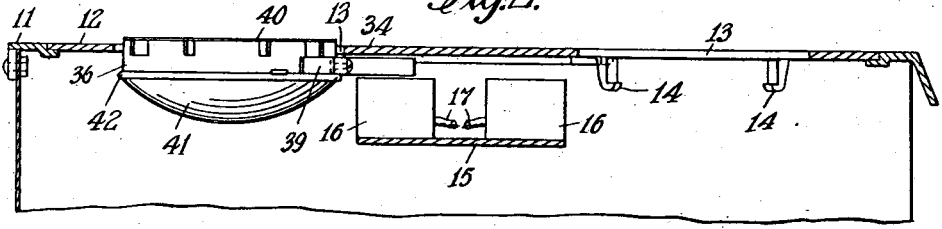
Fig. 2 is a fragmentary longitudinal section of the stove, with one unit mounted therein and indicated in elevation.
Figure 3:
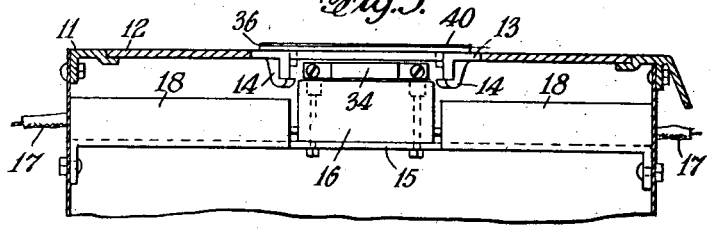
Fig. 3 is a fragmentary transverse section taken on the line 3—3, Fig. 1, looking in the direction of the arrows.

Referring to the drawings, 11 designates the supporting frame of an electric stove, said frame carrying a removable top plate 12 provided with a plurality of openings 13—in the present instance two. The said top plate 12 at the respective openings 13 is provided with a plurality of downwardly extending arms or hook members 14 for receiving and supporting the heater unit hereinafter described. A strap 15, moreover, is secured to the sides of the framing 11 beneath the top plate 12 for supporting terminal blocks 16 and to which strap the same are securely bolted. These blocks are arranged between the pair of openings 13, and conductors 17 are connected to the respective terminal blocks, as is well understood, and are brought outwardly to the front or rear of the stove thru a channel portion 18 of the strap 15. The foregoing description relates to more or less well-known constructions of stove and forms no particular part of the present invention which relates more especially to the heater unit itself as mounted in said openings. The mounting, furthermore, with respect to the terminal blocks 16 is such that the heating element portion may readily and conveniently be removed as a unit from its corresponding terminal block, as for inspection and cleaning if necessary, or for renewal.

Referring more particularly to Figs. 4 to 10 of the drawings, the heater or cooking unit comprises a spider frame for supporting a resistor element preferably in the form of a spiral, said resistor element being arranged to be entirely covered by an open top plate or cover, and a reflector member beneath the resistor coil and support is provided to reflect upwardly thru the openings in the cover heat developed in the resistor coil. More specifically, the spider or frame is made up of two arm members 20 and 21 of equal length and of slightly different forms. The arm 20, for example, is provided with a narrow slit 22 directed upwardly from its lower edge midway of its ends to substantially one half the width of the center or hub portion 23, while the arm 21 has a center or hub 24 which is slitted from the upper edge downwardly substantially one half the width of the arm to provide an opening 25 which is of greater width than the slit 22. The arm 20 is designed to be fitted over the arm 21 thru the interlocking of the slit 22 and opening 25; and further arm members 26 of the type of arm 20, but bent along at the middle to an angle of 90°, are arranged to be dropped over the arm 21 thru their respective slits 22 and interlock with the opening 25. In the construction shown, two such angle arms 26 are employed in addition to the two straight arms 20 and 21 which are located at right angles to each other, the angle arms being thus located substantially midway between the respective straightaway arms; but it will be understood that by bending the angle arms to sharper angles additional members may thus be included in the spider structure.

The various arm members having thus been assembled, as indicated in Fig. 9, the same may be spot welded to one another to prevent any shifting and thus form a substantial though open support. Portions of the respective upper edges of the arms 20 and 21, thus assembled into a spider support, are depressed or cut away as indicated to accommodate grooved blocks 30 of refractory material as porcelain, said blocks sliding and fitting over the respective edges and having a plurality of transverse openings 31 therethru. These openings are designed to receive and support the resistor member which is in the nature of a wire 32, as of nichrome or other suitable material, and in which the desired heat is developed when the electricity is applied thereto. The ends of the coil for this purpose are connected to terminals 33 of a separable block member 34 having, for example, knife blade contact with a corresponding terminal block 16, a block 34 affording thereby a convenient means of handling the unit in installing the same in or removing it from the stove, as is well understood. The wire 32 is preferably coiled in the form of a spiral, the ends passing thru insulation bushings 35 which are retained in a ring member 36 surrounding the spider support and into vertical slots 37 which fit the extreme outer and notched ends 38 of the respective arm members, the said terminal block 34 being also secured to the ring 36 as by a bracket 39. Over the top of the ring is further provided a cover member 40 of a suitable metal stamping which is cut away except at portions conforming to the convolutions of the heating coil and the radially directed arms of the spider; and the said cover may be spot welded to the upper edge of the ring 36, thus retaining positively the arms therein and forming with the same and with the supporting frame for the coil a unitary structure.

The heat developed in the coil is, therefore, freely available thru the intermediate open space; and arrangement is made to further direct, or rather reflect, upwardly thru said openings the heat developed by said coil in that a reflector member 41 is provided beneath the heating unit hereinbefore described. This member is in the nature of a concave or parabolically shaped piece of metal which is polished over its inner surface and is arranged to rest upon the hooks 14, as thru its beaded edge 42; and the heating unit thru the lower edge of its ring 36 is supported or rests on the top of said edge but is freely separable therefrom. Spacer lugs 43 may be struck from the lower edge of ring 36 to rest over the supporting hooks and properly center a heating unit; and there is provided substantially at the lowermost portion or in the vertical axis of the reflector member a suitable opening 44 to prevent any accumulation of liquid therein which might spill over or drop from a cooking vessel resting on the cover or hot plate 40. The reflector 41 resting merely upon the hooks 14 is also conveniently removable.

The heat developed in the coil 32 is thus concentrated and freely available and directed upwardly thru the top cover member of the unit to impinge directly upon a cooking utensil set thereon, the openings between successive convolutions being of ample proportions to pass thru the heat; and as only a comparatively small portion of the coil itself contacts with the support, absorption and conduction losses are reduced to a minimum. The portion beneath the top being substantially closed by the reflector shell and by the ring 36, substantially all of the heat is conserved for useful purposes.

I claim:—

1. An electric hot plate, comprising an openly supported electric heating member including a heating element, a metallic top plate with solid portion entirely covering the heating element and having intermediate openings through which heated air may be delivered from the heating element, and a reflector member beneath said heating element.

2. An electric hot plate, comprising an openly supported electric heating member including a substantially spirally disposed wire heating element, a metallic top plate with solid portion entirely covering the heating element over its convolutions and having intermediate spirally disposed openings through which heated air may be delivered from the heating element, and a reflector member beneath said heating element.

3. An electric hot plate, comprising a concave reflector and means to support the same; an openly supported electric heating member resting upon the edge of said reflector and including a spider frame, horizontally perforated blocks of refractory and electrical insulating material mounted over said frame, a resistor wire spirally threaded thru the openings of said blocks; a metallic top plate with solid portion entirely covering the convolutions of the resistor wire and having intermediate spirally disposed openings and through which heated air may be delivered from the resistor wire and separable contact members, one of which is connected with the ends of the resistor wire and affords means by which the said heating member may be placed on or removed from the reflector.

4. An electric hot plate, comprising a concave reflector and means to support the same; an openly supported electric heating member resting upon the edge of the said reflector and including a spider frame, horizontally perforated blocks of refractory and electrical insulating material mounted over said frame, a resistor wire spirally threaded thru the opening of said blocks; a top plate substantially covering the heat resistor wire over its convolutions and provided with intermediate openings spirally disposed and through which heated air may be delivered from the heating element; and separable terminal contact members, one of which is connected with the ends of the resistor wire and affords means by which the said heating member may be placed on or removed from the reflector.

5. A heating member for electric cooking stoves, comprising a metallic spider frame work, a plurality of horizontally perforated blocks of refractory and electrical insulating material mounted over the individual arms of the spider, a resistor wire spirally threaded thru the openings of said blocks, a ring surrounding the ends of the arms and fitted thereto to support the same, and a cover member substantially covering the convolutions of the resistor element and the arms of the supporting spider and having intermediate openings spirally disposed and through which heated air may be delivered from the resistor element, and a reflector member beneath said resistor wire.

6. In a heating member for electric cooking stoves: a spider support for the resistor element, comprising a pair of metallic strips slitted respectively from the top and bottom substantially at the central portion and adapted to interlock, metal strips similar to one of the said arms bent at an angle and slitted and set over the other of said arms substantially at the central portion, and the ends of the respective arms being notched, a ring member surrounding said ends and slitted downwardly from the upper edge to receive the respective notched ends of the said arms, and a cover member resting upon and secured to the upper edge of said ring.

7. In a heating member for electric cooking stoves: a spider support for the resistor element, comprising a pair of metallic strips slitted respectively from the top and bottom substantially at the central portion and adapted to interlock, metal strips similar to one of the said arms bent at an angle and slitted and set over the other of said arms substantially at the central portion, and the ends of the respective arms being notched, a ring member surrounding said ends and slitted downwardly from the upper edge to receive the respective notched ends of the said arms, a cover member resting upon and secured to the upper edge of said ring, and a terminal block secured to said ring.

8. In an electric stove: the top plate of the stove provided with openings, and hooks secured thereto below said openings; a reflector member having a beaded edge, said edge being adapted to rest upon the hooks of the opening; a strap passing beneath said plate; a terminal block secured thereto; and a removable heating member adapted to be supported upon said reflector member and including a terminal block adapted to cooperate with the said terminal block secured to the strap.

9. In an electric stove: the top plate of the stove provided with openings, and hooks secured thereto below said openings; a reflector member having a beaded edge, said edge being adapted to rest upon the hooks of the opening; a strap passing beneath said plate; a terminal block secured thereto; and a removable heating member supported upon said reflector member and comprising a pair of metallic strips slitted respectively from the top and bottom substantially at the central portion and adapted to interlock, metal strips similar to one of the said arms bent at an angle and slitted and set over the other of said arms substantially at the central portion, and the ends of the respective arms being notched, a ring member surrounding said ends and slitted downwardly from the upper edge to receive the respective notched ends of the said arms, a cover member resting upon and secured to the upper edge of said ring, and a terminal block secured to said ring and adapted to cooperate with the said terminal block secured to the strap.

In testimony whereof I affix my signature.

WILLIAM G. NORDLING.